US009445193B2

(12) United States Patent
Tico et al.

(10) Patent No.: US 9,445,193 B2
(45) Date of Patent: Sep. 13, 2016

(54) ELECTRONIC DEVICE DIRECTIONAL AUDIO CAPTURE

(75) Inventors: Marius Tico, Mountain View, CA (US); Matti S. Hamalainen, Denges (CH); Markku K. Vehvilainen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1988 days.

(21) Appl. No.: 12/221,395

(22) Filed: Jul. 31, 2008

(65) Prior Publication Data

US 2010/0026780 A1    Feb. 4, 2010

(51) Int. Cl.
| | |
|---|---|
| H04R 3/00 | (2006.01) |
| G06T 7/20 | (2006.01) |
| H04N 7/14 | (2006.01) |
| H04R 27/00 | (2006.01) |
| H04R 29/00 | (2006.01) |
| G10L 21/0208 | (2013.01) |
| H04M 1/60 | (2006.01) |

(52) U.S. Cl.
CPC ............ *H04R 3/005* (2013.01); *G06T 7/2033* (2013.01); *G10L 21/0208* (2013.01); *H04N 7/142* (2013.01); *H04R 27/00* (2013.01); *H04R 29/005* (2013.01); *G06T 2207/10021* (2013.01); *G06T 2207/30201* (2013.01); *H04M 1/6041* (2013.01); *H04M 2250/52* (2013.01)

(58) Field of Classification Search
CPC ............................. H04N 7/15; H04R 29/005
USPC ................ 348/14.02, 14.16, 14.08–14.1
See application file for complete search history.

(56) References Cited

U.S. PATENT DOCUMENTS

| | | | |
|---|---|---|---|
| 5,335,011 A | 8/1994 | Addeo et al. | 348/15 |
| 5,686,957 A * | 11/1997 | Baker | 348/36 |
| 5,940,118 A * | 8/1999 | Van Schyndel | 348/14.05 |
| 6,005,610 A * | 12/1999 | Pingali | 348/169 |
| 6,593,956 B1 * | 7/2003 | Potts et al. | 348/14.09 |
| 6,618,485 B1 | 9/2003 | Matsuo | 381/92 |
| 6,757,397 B1 | 6/2004 | Buecher et al. | 381/122 |

(Continued)

FOREIGN PATENT DOCUMENTS

| | | |
|---|---|---|
| CN | 1460185 A | 12/2003 |
| JP | 2006-222618 | 8/2006 |

OTHER PUBLICATIONS

R.L. Hsu, et al., "Face Detection in Color Images", IEEE Transactions on Pattern Analysis and Machine Intelligence, 24:696-706, 2002.

(Continued)

*Primary Examiner* — Nam Huynh
(74) *Attorney, Agent, or Firm* — Harrington & Smith (57) ABSTRACT

Disclosed herein is an apparatus. The apparatus includes a housing, electronic circuitry, and an audio-visual source tracking system. The electronic circuitry is in the housing. The audio-visual source tracking system includes a first video camera and an array of microphones. The first video camera and the array of microphones are attached to the housing. The audio-visual source tracking system is configured to receive video information from the first video camera. The audio-visual source tracking system is configured to capture audio information from the array of microphones at least partially in response to the video information. The audio-visual source tracking system might include a second video camera that is attached to the housing, wherein the first and second video cameras together estimate the beam orientation of the array of microphones.

25 Claims, 8 Drawing Sheets

(56) References Cited

U.S. PATENT DOCUMENTS

| | | | |
|---|---|---|---|
| 6,826,284 B1 | 11/2004 | Benesty et al. | 381/92 |
| 7,313,243 B2 | 12/2007 | Hsu | 381/92 |
| 7,518,631 B2* | 4/2009 | Hershey et al. | 348/14.1 |
| 7,560,679 B1 | 7/2009 | Gutierrez | 25/208.1 |
| 8,059,840 B2* | 11/2011 | Chen | 381/122 |
| 8,165,416 B2 | 4/2012 | Cutler | 382/274 |
| 2004/0041902 A1 | 3/2004 | Washington | 348/14.01 |
| 2005/0221867 A1* | 10/2005 | Zurek et al. | 455/569.1 |
| 2005/0270410 A1 | 12/2005 | Takayama | 348/345 |
| 2006/0133623 A1* | 6/2006 | Amir et al. | 381/92 |
| 2007/0016426 A1 | 1/2007 | Hershey et al. | 704/277 |
| 2008/0100719 A1* | 5/2008 | Huang | 348/211.99 |

OTHER PUBLICATIONS

M.H. Yang et al., "Detecting Faces in Images: A Survey", IEEE Transactions on Pattern Analysis and Machine Intelligence, 24:34-58; 2002.

Hadid et al., "A Hybrid Approach to Face Detection Under Unconstrained Environments", International Conference of Pattern Recognition, (ICPR 2006).

U. Bub et al., "Knowing Who to Listen to in Speech Recognition: Visually Guided Beamforming", Interactive System Laboratories.

Collobert et al., "Listen: A System for Locating and Tracking Individual Speakers", France Telecom, IEEE Transaction (1999).

Strobel et al., "Joint Audio-Video Object Localization and Tracking" IEEE Signal Processing Magazine (2001).

* cited by examiner

ELECTRONIC DEVICE DIRECTIONAL AUDIO CAPTURE

BACKGROUND OF THE INVENTION

1. Field of the Invention

The invention relates to an electronic device and, more particularly, to directional audio capture for an electronic device.

2. Brief Description of Prior Developments

Electronic devices having speaker phone or hands free applications are known in the art. During a hands free voice call, any sounds other than the user's voice may be considered as background noise which should be attenuated (or eliminated) in order to improve the quality of the phone conversation. The noise can be related to environment, network, and audio chains corresponding to sending and receiving signals. The environmental noise (or interfering sounds/background noise) can easily interfere during the hands free voice call and sometimes can exceed the user's voice (signal) level such that it becomes very difficult to separate the two. This may cause a poor signal to noise ratio (SNR).

There are several audio-only source tracking techniques for speech communication known in the art. With conventional configurations providing for sending an audio use directivity pattern that can attenuate the sensitivity to outside of the source (user) direction, it is possible to improve the SNR and eliminate the unwanted signals from the source signals before the signal is transmitted. However, this assumes that the direction-of-arrival (DOA) of the signal is known or can be estimated. Additionally, audio based tracking using the conventional techniques generally does not work for a silent moving source.

In the case of hand-held mobile communication devices the relative position of the sound sources can also move due to the movement of the device. Continuous handling of the device (e.g. due to spontaneous gestures and hand movements) makes the source tracking task much more challenging compared to a traditional meeting room setup where the device can be assumed to be relatively stationary compared to the movement of the sound source. Device movements can introduce very fast changes in the DOA that would be unlikely by the movement of the sound source.

In a typical mobile communication voice call, the relative position of the user and the device can change. Since the audio-only tracking systems require audio data for the calculation of DOA angle(s), this introduces a processing delay for the tracking information (thus preventing real-time source location information updates). Unfortunately in real-time voice communication the end-to-end delay needs to be minimized for fluent operation. This can lead into several problems. For example, when the user moves during speech pauses, the source tracker may lose the correct source position during the silent periods. When the speaker starts to talk, the beginning of the sentence could be distorted due to incorrect location information. From the multi-microphone noise reduction point of view this means that the user's voice is processed as a background noise source until the correct location information is taken into account.

Another class of directional audio capture algorithms form the directivity pattern of the microphone array by utilizing the statistical properties of the signal. These algorithms do not utilize dedicated sound source location information but try to self-adapt to the desired source. Typically these algorithms need to adapt to the changes both in the source location but also in the room impulse response. This makes these algorithms relatively slow in reacting to instantaneous changes in the environment. It is also non-trivial to control an algorithm that is making autonomous decisions about the source direction without a possibility for an external control. For example in the case of loud interfering source (a.k.a jammer), it becomes more difficult to control the microphone array to classify the source as a noise source, especially if the signal statistics of the interfering source are similar to the desired source, e.g. in the case of competing talker.

Additionally, human face detection and video tracking of human faces are known in the art. Face detection deals with the localization of a face (or multiple faces) in an input image. The process includes scanning the entire image, if no prior knowledge about the face position is available. Face tracking may also extend to face detection by using temporal correlation to locate a human face in a video sequence. Rather than detecting the face separately in each frame, knowledge about the face position in the previous frame is used in order to narrow the search in the current frame.

For example, "Face Detection In Color Images" (R. L. Hsu, M. Abdel-Mottaleb, and A. K. Jain, IEEE Transactions on Pattern Analysis and Machine Intelligence, 24:696-706, 2002), which is hereby incorporated by reference in its entirety, describes one approach to face detection based on skin color detection. Approaches for face detection (or tracking) based on skin color detection generally determine and group the skin color pixels which are found in the image. Next, for each such group of pixels, a bounding box (or the best fitting ellipse) is computed. The skin components which verify certain shape and size constraints are selected as face candidates. Finally, features (such as eyes and mouth) are searched inside each face candidate based on the observation that holes inside the face candidate are due to these features being different from the skin color.

Further, "Detecting Faces In Images: A Survey" (M. Yang, D. J. Kriegman, and N. Ahuja, IEEE Transactions on Pattern Analysis and Machine Intelligence, 24:34-58, 2002), which is hereby incorporated by reference in its entirety, describes one approach to face detection based on face texture information.

Moreover, "A Hybrid Approach To Face Detection Under Unconstrained Environments" (A. Hadid, M. Pietikainen, International Conference of Pattern Recognition (ICPR 2006)), which is hereby incorporated by reference in its entirety, describes one approach to face detection based on color and texture information.

U.S. Pat. No. 6,826,284, which is hereby incorporated by reference in its entirety, discloses a system where source tracking information enables device control, such as camera steering, for example.

In addition, "Knowing Who To Listen To In Speech Recognition: Visually Guided Beamforming" (U. Bub, M. Hunke, and A. Waibel, Interactive System Laboratories, IEEE 1995) and "Listen: A System For Locating And Tracking Individual Speakers" (M. Collobert, R. Ferraud, G. Le Tourneur, O. Bernier, J. E. Viallet, Y. Mahieux, D. Collobert, France Telecom, IEEE Transactions (1999)), which are hereby incorporated by reference in their entireties, disclose using a mechanical device to move a camera towards a user's face for visual and audio tracking used in fixed teleconferencing conditions.

"Joint Audio-Video Object Localization and Tracking" (N. Strobel, S. Spors and R. Rabenstein, IEEE Signal Processing Magazine (2001)), discloses an object tracking methodology.

Further, U.S. Pat. No. 5,335,011 discloses using a sound localization technique which is based on the prior knowledge of the position of each user.

However, despite the above advances, there is still a strong need to provide an improved audio capture system.

SUMMARY

In accordance with one aspect of the invention, an apparatus is disclosed. The apparatus includes a housing, electronic circuitry, and an audio-visual source tracking system. The electronic circuitry is in the housing. The audio-visual source tracking system includes a first video camera and an array of microphones. The first video camera and the array of microphones are attached to the housing. The audio-visual source tracking system is configured to receive video information from the first video camera. The audio-visual source tracking system is configured to capture audio information from the array of microphones at least partially in response to the video information.

In accordance with another aspect of the invention, a method is disclosed. A housing is provided. Electronic circuitry is installed in the housing. A tracking system is provided proximate the housing. Therein the tracking system includes a first video camera and a microphone. The first video camera is attached to the housing. The microphone is proximate the first video camera. The tracking system is configured to receive a video signal from the first video camera. The tracking system is configured to capture an audio signal from the microphone at least partially in response to the video signal.

In accordance with another aspect of the invention, a method is disclosed. A first image is captured with a camera of an apparatus. An orientation of a portion of the first image is determined. A predetermined characteristic of a microphone array of the apparatus is controlled based at least partially on the orientation of the portion of the first image.

In accordance with another aspect of the invention, a program storage device readable by a machine, tangibly embodying a program of instructions executable by the machine for performing operations to sense an audio signal is disclosed. A portion of an image is analyzed. A direction corresponding to the portion of the image is calculated. The direction is relative to an apparatus. A microphone array is directed from the apparatus based at least partially upon the calculated direction.

BRIEF DESCRIPTION OF THE DRAWINGS

The foregoing aspects and other features of the invention are explained in the following description, taken in connection with the accompanying drawings, wherein.

DETAILED DESCRIPTION

Figure 1:
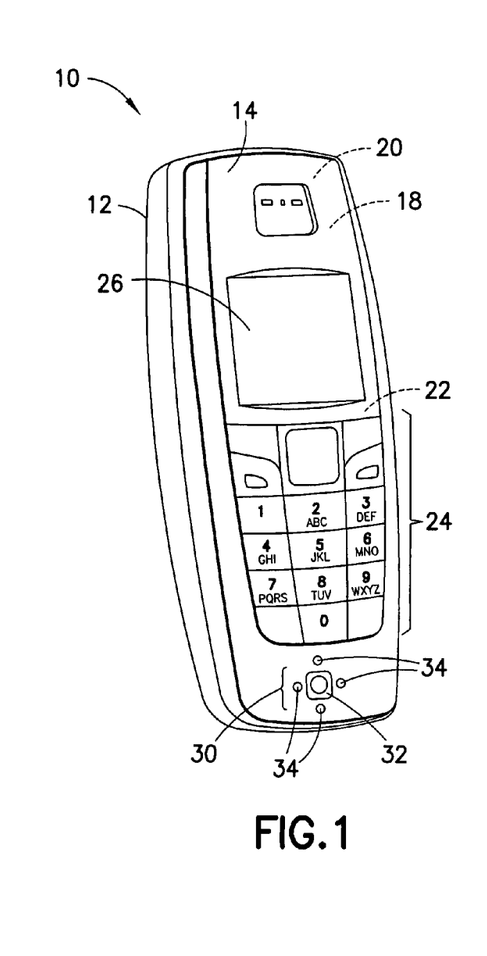
FIG. 1 is a perspective view of a front face of an electronic device incorporating features of the invention.

Referring to FIG. 1, there is shown a perspective view of an electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

Figure 2:
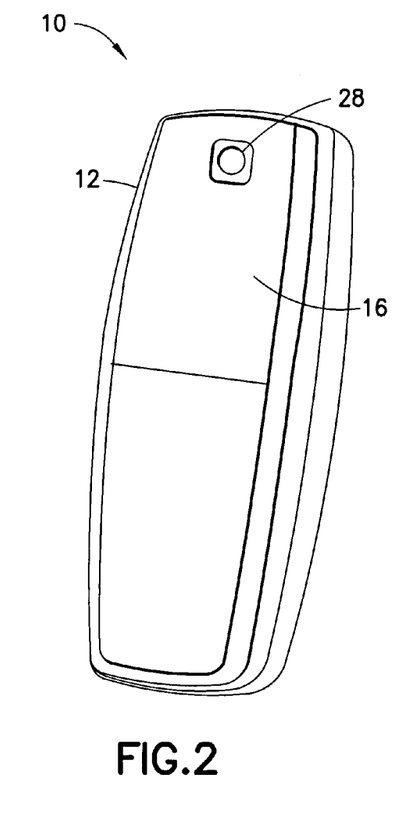
FIG. 2 is a perspective view of a back face of the electronic device shown in FIG. 1.

According to one example of the invention shown in FIGS. 1 and 2, the device 10 is a multi-function portable electronic device. However, in alternate embodiments, features of the exemplary embodiment of this invention could be used in any suitable type of hand-held portable electronic device such as a mobile phone, a gaming device, a music player, or a PDA, for example. In addition, as is known in the art, the device 10 can include multiple features or applications such as a camera, a music player, a game player, or an Internet browser, for example.

Referring also to FIG. 2, the device 10 generally comprises a housing 12 having a front face 14 and a back face 16, a transceiver 18 connected to an antenna 20, electronic circuitry 22, such as a controller and a memory for example, within the housing 12, a user input region 24 and a display 26. The display 26 could also form a user input section, such as a touch screen. It should be noted that in alternate embodiments, the device 10 can have any suitable type of features as known in the art.

The electronic device 10 further comprises a primary camera 28, and an audio-visual source tracking system 30. The primary camera 28 is mounted within the housing 12 proximate the back face 16 of the device 10. The camera 28 could comprise a still image digital camera and/or a video camera, or any other suitable type of image taking device.

The audio-visual source tracking system 30 comprises a secondary camera 32, and an array of microphones 34.

The secondary camera 32 is mounted within the housing 12 proximate the front face 14 of the device 10. The camera 32 may comprise a video camera for example. The video camera may be oriented and configured to capture an image of a face of a user of the device. The video camera may be used for video capture when performing video calling with the device. However, any suitable type of image taking device may be provided. For example, in alternate embodiments, the video camera may also be a web cam mounted to a computer for video calling.

It should further be noted that the camera may, according to one embodiment of the invention, be a camera used for video calls in a mobile phone where dual cameras have been integrated one facing the rear and another facing the user which is dedicated for video hands free calls.

The array of microphones 34 are mounted within the housing 12 proximate the secondary camera 32. The array of microphones 34 may surround the camera 32 (in close proximity). However, in alternate embodiments, any suitable location or orientation for the microphones 34 may be provided. The array of microphones 34 are configured to capture a voice of a user of the device. The microphones 34 may be configured for microphone array beam steering in two dimensions (2D) or in three dimensions (3D). In the example shown in FIG. 1, the array of microphones 34 comprises four microphones. However, in alternate embodiments, more or less microphones may be provided. For example, in one embodiment, the array of microphones 34 may comprise three microphones.

The relative positions and orientations of the camera 32 and microphone array 34 may be either be known (fixed) in advance, or estimated based on time averaged of visual and acoustic source tracking information. However, it should be noted that the relative positions and orientations of the camera and microphone array may be provided with any other suitable location means known in the art. Either the microphone array or the camera, or both, may provide information about the source distance.

It should be noted that although the figures illustrate the primary camera 28 at the back face 16 of the electronic device 10 and the audio-visual source tracking system 30 at the front face 14 of the device, alternate embodiments may comprise the camera 28 and the audio-visual source tracking system 30 at any suitable location. For example, the primary camera 28 may be provided at the front face 14 of the electronic device 10 and the audio-visual source tracking system 30 may be provided at the back face 16 of the device 10. In another example, the primary camera 28 and the audio-visual source tracking system 30 may both be provided at the front face 14 or the back face 16 of the electronic device 10. Additionally, one or both of the camera 28 and the audio-visual source tracking system 30 may be provided at a lateral side face of the housing 12. The camera information may also be utilized to track the movement of the device. It should further be understood that more than two cameras or a single camera (wherein the single camera functions as the primary camera and the secondary camera) may be provided.

According to various exemplary embodiments of the invention, the audio-visual source tracking system 30 provides face tracking assisted directional audio capture for telephone and video telephone conversations. The audio-visual source tracking system 30 improves the uplink audio performance (or audio quality) of hands free voice/video calls in noisy environments which is noticeable by the end user during a mobile speech call.

The audio-visual source tracking system 30 may provide for video tracking of human faces and the controlling of the directional sensitivity of the microphone array for directional audio capture to improve the quality of voice and/or video calls in noisy environments. Examples of the invention may include advanced techniques for robust and efficient face detection and tracking. Such techniques and algorithms have been developed by several research groups and they are currently in use in several applications (e.g. face recognition, face tracking, etc). Face tracking algorithms can achieve high performance and may be run in real time even relatively lower computational power machines, such as mobile phones, for example.

The audio-visual source tracking system 30 is configured to use the video information corresponding to the user's face position in order to assist the audio capturing process. This may be performed by determining the mouth reference point of the user speaking into the device and forming the beam of the microphone array towards the user's mouth (or reference point).

The audio-visual source tracking system 30 detects and tracks the user's face in the video frames captured by the secondary camera (as the secondary camera is oriented towards the user of the device). The fixed positions of the camera and microphones within the device allows for a known orientation of the camera relative to the orientation of the microphone array. The audio-visual source tracking system 30 may be configured for selective enhancement of the audio capturing sensitivity along the specific spatial direction towards the user's mouth. For example, the sensitivity of the microphone array 34 may be adjusted towards the direction of the user (such as, when the user is speaking, for example). It is therefore possible to reject unwanted sounds which enhance the quality of audio that is transmitted to the far end user. The unwanted sounds may come from the sides of the device, or any other direction (such as any direction other than the direction towards the user's mouth, for example), and could be considered as background noise which may be cancelled or significantly reduced.

In enclosed environments where reflections might be evident, as well as the direct sound path, examples of the invention improve the direct sound path by reducing and/or eliminating the reflections from surrounding objects (as the acoustic room reflections of the desired source are not aligned with the DOA of the direct sound path). The attenuation of room reflections can also be beneficial, since reverberation makes speech more difficult to understand. Embodiments of the invention provide for audio enhancement during silent portions of speech partials by tracking the position of the user's face by accordingly directing the beam of the microphone array towards the user.

Various exemplary embodiments of the invention overcome the limitations of conventional pure audio techniques by allowing the separation, reduction, and estimation (at very low SNR levels) of a moving source during the speech pauses by using the additional information about the direction of the desired signal.

Figure 3:
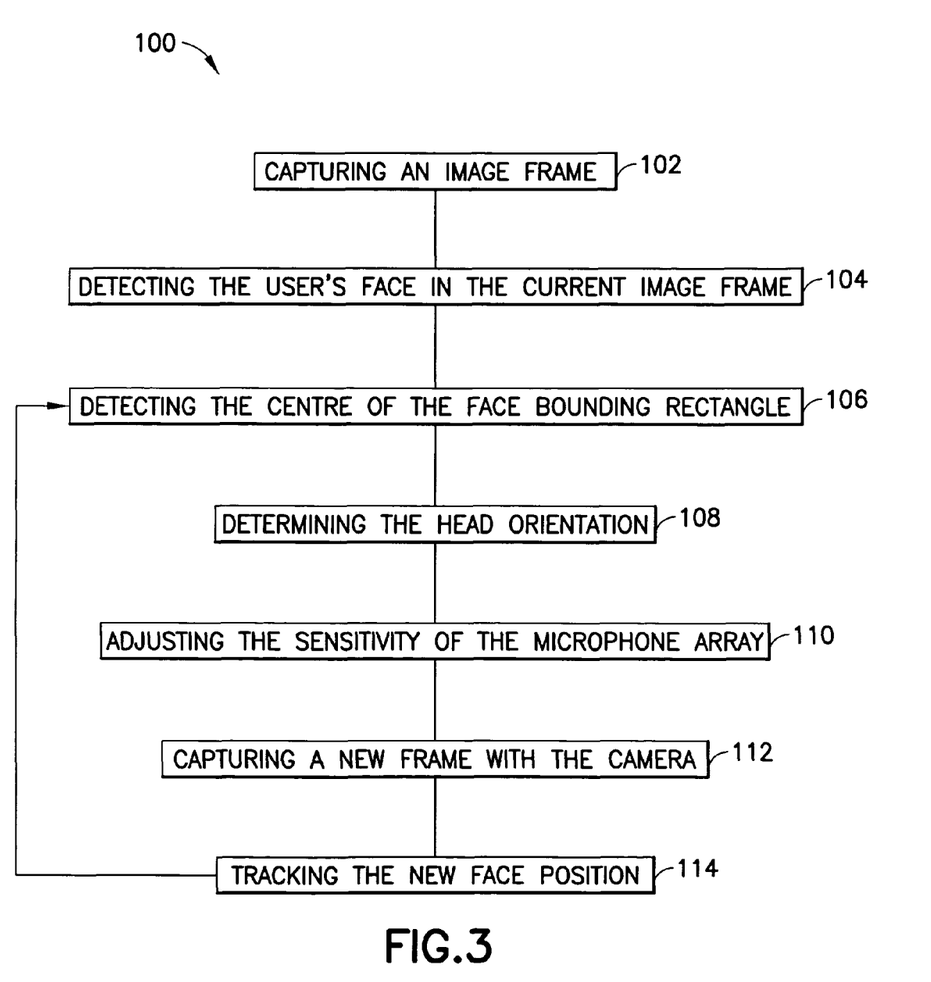
FIG. 3 is a block diagram of an exemplary algorithm used in the electronic device shown in FIG. 1.
Figure 4:
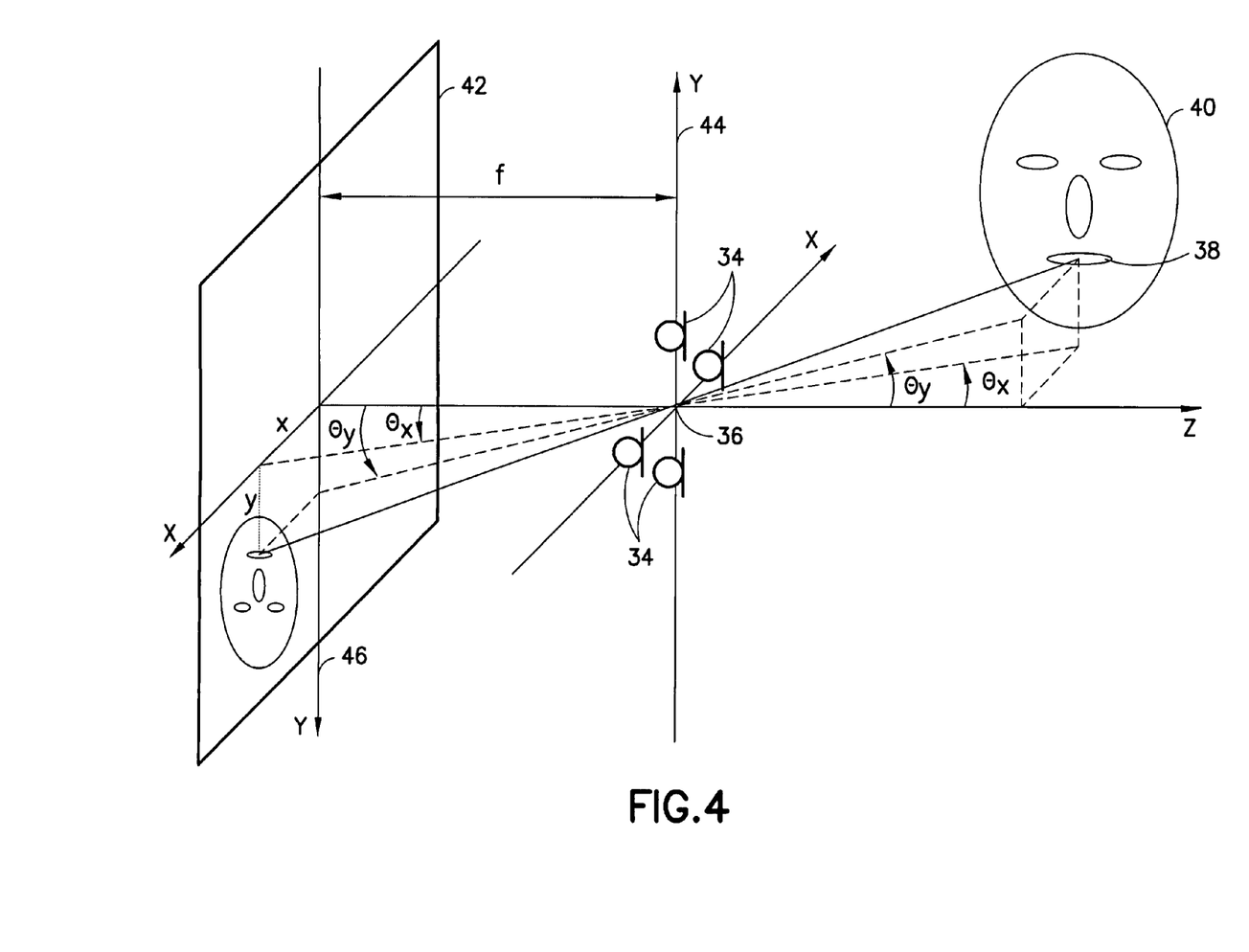
FIG. 4 is a diagram of an a portion of a tracking system used in the electronic device shown in FIG. 1 relative to a user and coordinate systems.
Figure 5:
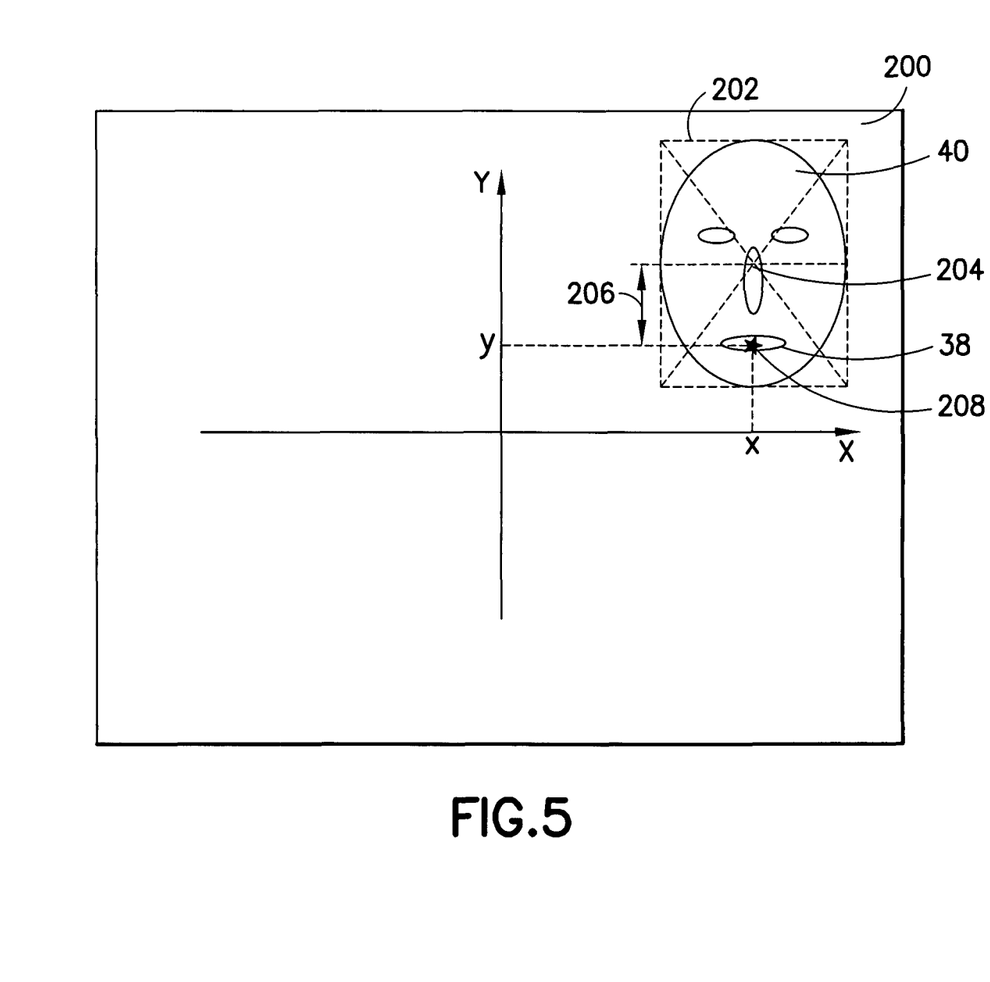
FIG. 5 is a diagram of face detection elements used in the tracking system of the electronic device shown in FIG. 1.

Referring now also to FIG. 3, an exemplary algorithm 100 of the audio-visual source tracking system 30 is illustrated. The algorithm may be provided for implementing the video tracking of the user and controlling the sensitivity of directional microphone beam (for the desired audio signal to be transmitted). The algorithm may include the following steps. Capturing an image frame with the secondary camera (step 102). Detecting the user's face in the current image frame. The face position can be detected using for instance skin colour approach (step 104). Detecting the centre of the face bounding rectangle and calculating the approximate position of the mouth (as shown in FIG. 5). The mouth can be also detected based on the fact that its color does not resemble the skin color (eyes and mouth appear as holes in the skin color group of the pixels) (step 106). Determining the head orientation (3D direction of the mouth), based on the mouth position in the video frame, and based on knowledge about the camera focal length. If the microphone array is close to the camera than the two angles (along horizontal and vertical directions) that define the 3D direction can be determined as follows:

$$\theta_x = a\tan(x/f), \theta_y = a\tan(y/f)$$

where f denotes the camera focal length, and x, y is the position of the mouth with respect to the frame image coordinates (see FIGS. 4, 5) (step 108). Increasing the directivity (relative sensitivity) of the microphone array along the direction determined at step 108 (step 110). Capturing a new frame with the secondary camera (step 112). Tracking the new face position in the new frame by searching in the neighbourhood of the previous face position in the previous frame (step 114). Return to step 106.

It should be noted that the algorithm may be provided as an infinite loop. However, in alternate embodiments, the algorithm could be a start/stop algorithm by specific user interface (UI) commands, for example. However, any suitable algorithm may be provided.

Referring now also to FIG. 4, a diagram illustrating one example of how the direction to the (tracking face/mouth) position (as presented in the algorithm 100 above) may be determined is shown. The direction (relative to the optical centre 36 of the camera 32) of the mouth 38 of the user 40 is defined by two angles $\theta_x$, $\theta_y$. In the embodiment shown the array of microphones 34 closely surround the optical centre 36 of the camera 32. Additionally, the image sensor plane where the image is projected is illustrated at 42, the 3D coordinate system with the origin at the camera optical center is illustrated at 44, and the 2D image coordinate system is illustrated at 46.

Referring now also to FIG. 5, a diagram illustrating various face detection elements (as presented in the algorithm 100 above) are shown. An exemplary image frame captured by the secondary camera is shown at 200. A face of the user 40 detected is shown in the image frame 200. A boundary rectangle of the face area is shown at 202. The center of the boundary rectangle is shown at 204. A displacement below the center where the position of the mouth 38 is assumed is shown at 206. The point of interest that approximates the position of the mouth is shown at 208.

Various exemplary embodiments of the invention provide an improved configuration allowing for a high quality hands free voice and/or video call (even in noisy environments). Additionally, the advantage of speaker tracking during speech pauses (such as sending audio during pauses between speech partials) may also be provided. Further, examples of the invention may utilize the existing camera hardware in mobile devices having two cameras (one facing towards the user). Yet further, embodiments of the invention may be adapted in single camera products providing that microphone arrays are located near camera module.

Figure 6:
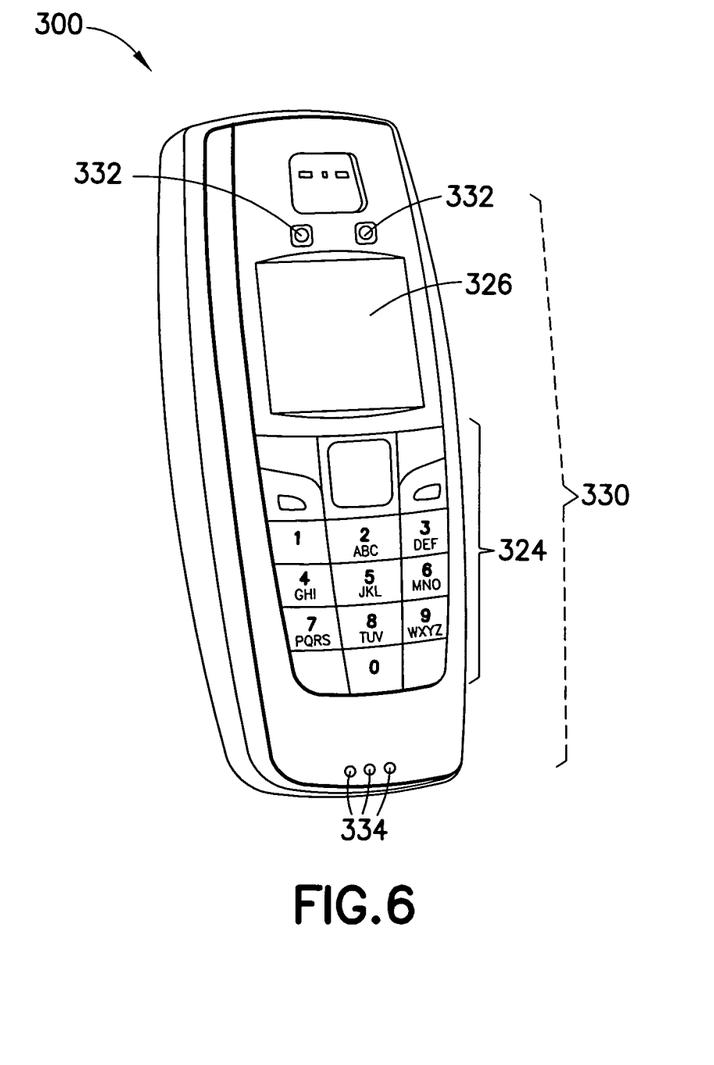
FIG. 6 is perspective view of another electronic device incorporating features of the invention.
Figure 7:
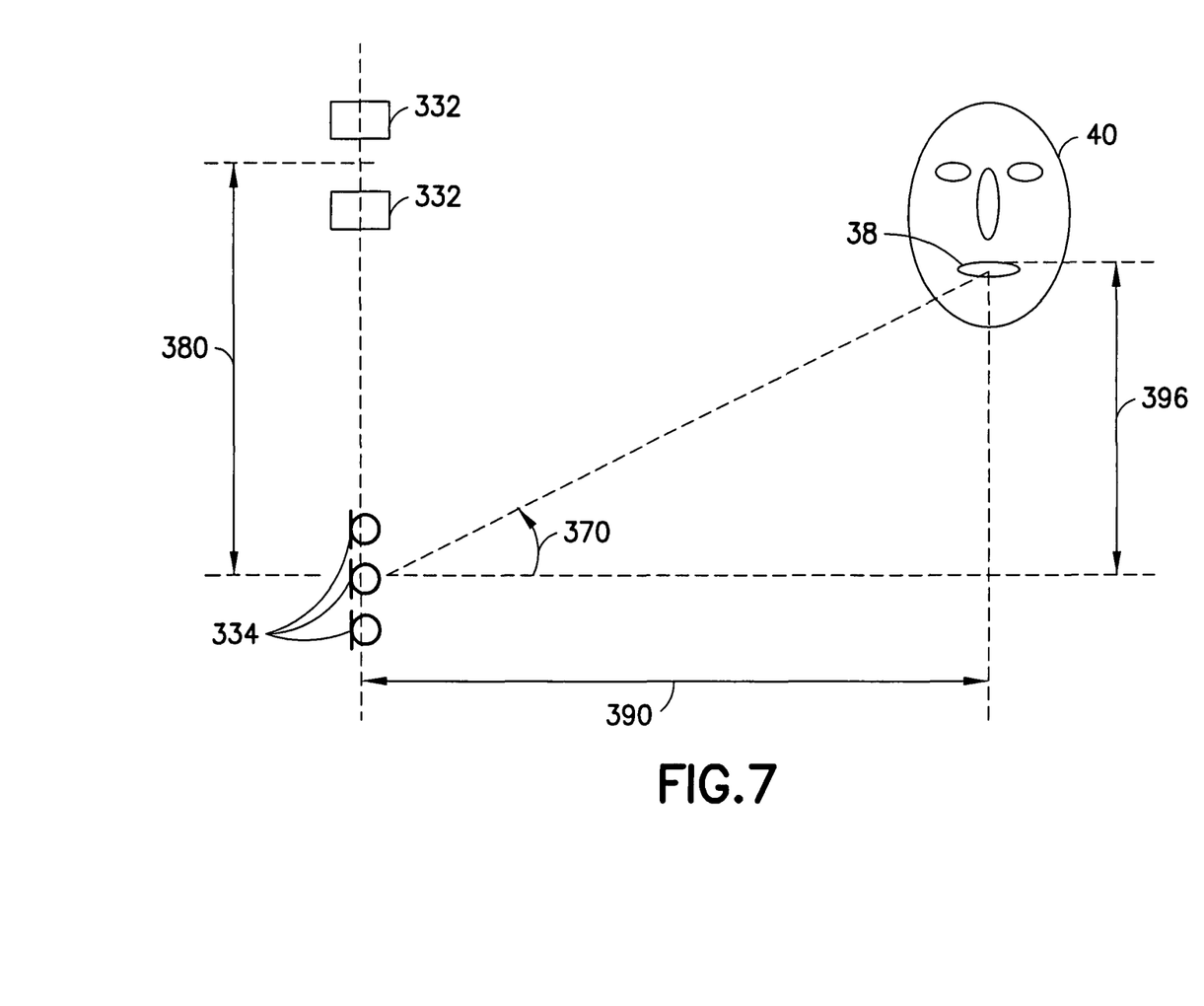
FIG. 7 is a diagram of an a portion of a tracking system used in the electronic device shown in FIG. 6 relative to a user.

Referring now also to FIGS. 6 and 7, an electronic device 300 having an audio-visual source tracking system 330 comprising two cameras 332 and three microphones 334 is illustrated. The audio-visual source tracking system 330 provides for audio quality improvement in uplink audio by using two cameras 332 to estimate the beam orientation 370 relative the mouth 38 of the user 40. If the microphone array 334 is located far away from the camera view angle (effectively camera module itself) as shown in FIG. 6, the distance between the user's 40 face position and center of the microphone array may be difficult to calculate. For example, for a larger distance 380, the depth 390 information may be provided to estimate the beam orientation 370. On the other hand, only one camera may be provided with the configuration of the audio-visual source tracking system 30 of the device 10 as the distance between the camera 32 and the microphones 34 is relatively small. The estimation of the microphone beam direction 370 relevant to the user 40 face may be provided by using two cameras 332 to estimate the depth 390. Embodiments of the invention therefore provide flexibility in mobile phone designs where microphone arrays can be designed by having a better microphone location flexibility. Additionally, it should be noted that an elevation (or azimuth) 396 of the mouth 38 of the user 40 may be estimated with one or more cameras. Distance information may be also obtained with a single 3D camera technology providing depth map for the image.

Figure 8:
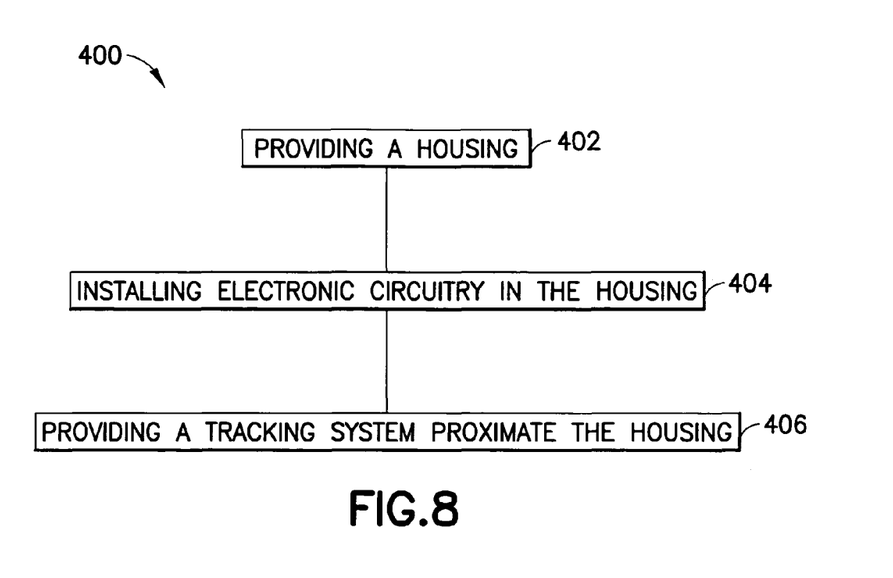
FIG. 8 is a block diagram of an exemplary method of the electronic device shown in FIG. 1 and FIG. 6.

FIG. 8 illustrates a method 400 of manufacturing the electronic device 10, 300. The method includes the following steps. Providing a housing (step 402). Installing electronic circuitry in the housing (step 404). Providing a tracking system proximate the housing, wherein the tracking system comprises a first video camera and a microphone, wherein the first video camera is attached to the housing, wherein the microphone is proximate the first video camera, wherein the tracking system is configured to receive a video signal from the first video camera, and wherein the tracking system is configured to capture an audio signal from the microphone at least partially in response to the video signal (step 406). It should be noted that any of the above steps may be performed alone or in combination with one or more of the steps.

Figure 9:
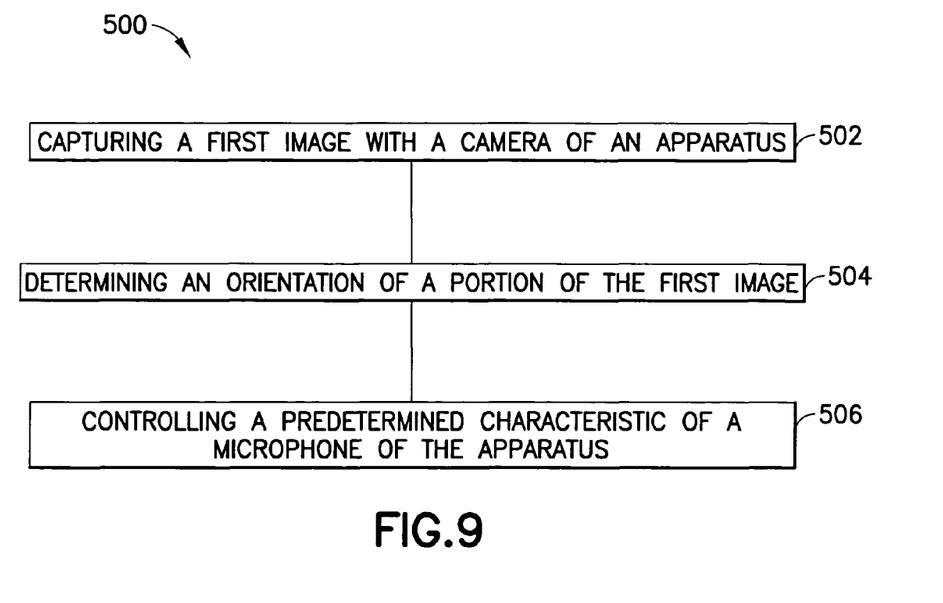
FIG. 9 is a block diagram of another exemplary method of the electronic device shown in FIG. 1 and FIG. 6.

FIG. 9 illustrates a method 500. The method includes the following steps. Capturing a first image with a camera of an apparatus (step 502). Determining an orientation of a portion of the first image (step 504). Controlling a predetermined characteristic of a microphone array of the apparatus based at least partially on the orientation of the portion of the first image (step 506).

Figure 10:
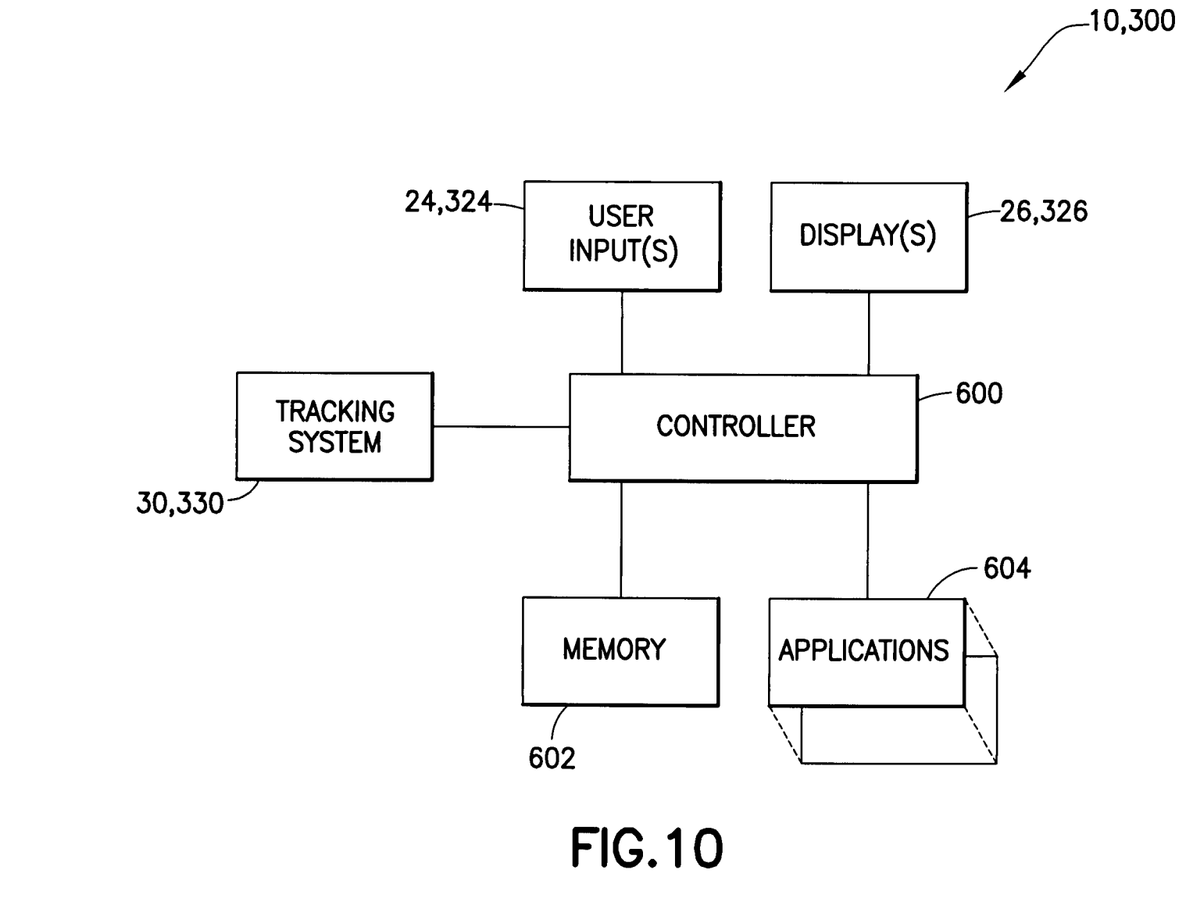
FIG. 10 a schematic drawing illustrating components of the electronic device shown in FIG. 1 and FIG. 6.

Referring now also to FIG. 10, the device 10, 300 generally comprises a controller 600 such as a microprocessor for example. The electronic circuitry includes a memory 602 coupled to the controller 600, such as on a printed circuit board for example. The memory could include multiple memories including removable memory modules for example. The device has applications 604, such as software, which the user can use. The applications can include, for example, a telephone application, an Internet browsing application, a game playing application, a digital camera application, etc. These are only some examples and should not be considered as limiting. One or more user inputs 24, 324 are coupled to the controller 600 and one or more displays 26, 326 are coupled to the controller 600. The audio-visual tracking system 30, 330 is also coupled to the controller 600. The device 10, 300 may programmed to automatically change capture or sense an audio signal. However, in an alternate embodiment, this might not be automatic. The user might need to actively select a change in the tracking system 30, 330.

Various exemplary embodiments of the invention provide advantages over audio only conventional configurations. In two way communication systems, a challenge occurs because the relative position of user (and accordingly the mouth reference point) and/or the position of the handset can change. The audio-only tracking systems require audio data for the calculation of the direction of arrival (DOA), and therefore a processing delay is introduced for the tracking information. In real-time voice communications, it is desirable for the end-to-end delay to be minimized for fluent operation. For instance, when user moves during silent portions of speech, the source tracker will lose the mouth reference point. The incorrect mouth reference point (that accordingly means incorrect directionality of the microphone beam) can easily cause distortions at the beginning of the initial speech partials. This is where an audio-visual source tracking system can be beneficial because it can update the source location information in real time. Microphone(s) having spatial directivity improve the capture of audio signals by emphasizing sounds that are coming from the direction of the desired source by attenuating the sensitivity to other directions. With audio-visual source tracing it is possible to steer the maximum sensitivity of the microphone array towards the desired source (generally the user's face (or mouth)).

According to one example of the invention, an apparatus is disclosed. The apparatus includes the following elements. A housing. Electronic circuitry in the housing. An audio-visual source tracking system comprising a first video camera and an array of microphones, wherein the first video camera and the array of microphones are attached to the housing, wherein the audio-visual source tracking system is configured to receive video information from the first video camera, and wherein the audio-visual source tracking system is configured to capture audio information from the array of microphones at least partially in response to the video information.

According to another example of the invention, a program storage device readable by a machine is disclosed. The program storage device tangibly embodies a program of instructions executable by the machine for performing operations to sense an audio signal. The program storage device may perform the following operations. Analyzing a portion of an image. Calculating a direction corresponding to the portion of the image, wherein the direction is relative to an apparatus. Directing a microphone array from the apparatus based at least partially upon the calculated direction.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus comprising:
    a housing; and
    an audio-visual source tracking system comprising a first video camera and an array of microphones, wherein the first video camera and the array of microphones are attached to the housing, wherein the array of microphones are proximate the first video camera, wherein the array of microphones is configured to have an adjustable beam, wherein the first video camera and the array of microphones are proximate an exterior portion of the housing of the apparatus, wherein the audio-visual source tracking system is configured to receive video information from the first video camera, wherein the audio-visual source tracking system is configured to capture audio information from the array of microphones at least partially in response to the video information, wherein the audio-visual source tracking system is configured to adjust and direct a sensitivity of the adjustable beam of the array of microphones while a user is speaking at least partially in response to the video information which tracks a head position of the user relative to the audio-visual source tracking system and is configured to update a location of the user, wherein the audio-visual source tracking system is further configured to adjust and direct the sensitivity of the adjustable beam of the array of microphones based at least partially upon a detected face of the user at a time after an initial face detection of the user, wherein a direction of the array of microphones is determined based, at least partially, on a ratio of the camera focal length and a reference point of the user, and wherein the apparatus is a portable electronic device.

2. The apparatus of claim 1 wherein the array of microphones comprises least three microphones.

3. The apparatus of claim 1 wherein the audio-visual source tracking system is configured to receive video information corresponding to a user of the apparatus from the first video camera.

4. The apparatus of claim 1 wherein the apparatus comprises a mobile handset.

5. The apparatus of claim 1 wherein the audio-visual source tracking system is configured to capture a voice of a user of the apparatus at least partially in response to an orientation of the user.

6. The apparatus of claim 1 wherein the first video camera is configured to be oriented towards a user of the apparatus, wherein fixed positions of the first camera and the array of microphones within the portable electronic device allows for a known orientation of the first video camera relative to the orientation of the array of microphones.

7. The apparatus of claim 1 wherein the array of microphones surrounds the first video camera.

8. The apparatus of claim 1 further comprising a second video camera, wherein the first and the second video cameras are configured to estimate a beam orientation for the array of microphones.

9. The apparatus of claim 1 further comprising a second video camera, wherein the first and the second video cameras are configured to estimate a beam orientation for the array of microphones, wherein the audio-visual source tracking system is configured to adjust and direct the sensitivity of the array of microphones at least partially in response to video information captured by the first video camera and the second video camera, and wherein the apparatus comprises a mobile handset.

10. The apparatus of claim 1 wherein each microphone of the array of microphones is configured for microphone array beam steering in two dimensions or in three dimensions.

11. The apparatus of claim 1 wherein the first video camera and the array of microphones are mounted to the housing proximate an exterior face of the housing.

12. The apparatus of claim 1 wherein a direction of the array of microphones is determined based, at least partially, on a first angle and a second angle, wherein the first angle corresponds to a ratio of the camera focal length and horizontal position of a reference point of the user, and wherein the second angle corresponds to a ratio of the camera focal length and a vertical position of a reference point of the user.

13. A method comprising:
    providing a housing; and
    connecting a tracking system to the housing, wherein the tracking system comprises a first video camera and an array of microphones, wherein the first video camera is attached to the housing, wherein the array of microphones is proximate the first video camera, wherein the array of microphones is configured to have an adjustable beam, wherein the first video camera and the array of microphones are proximate an exterior portion of the housing, wherein the tracking system is configured to receive a video signal from the first video camera, wherein the tracking system is configured to capture an audio signal from the array of microphones at least partially in response to the video signal, wherein the audio-visual source tracking system is configured to adjust and direct a sensitivity of the adjustable beam of the array of microphones while a user is speaking at least partially in response to the video information which tracks a head position of the user relative to the audio-visual source tracking system and is configured to update a location of the user, wherein the audio-visual source tracking system is further configured to adjust and direct the sensitivity of the adjustable beam of the array of microphones based at least partially upon a detected face of the user at a time after an initial face detection of the user, wherein a direction of the array of microphones is determined based, at least partially, on a ratio of the camera focal length and a reference point of the user, and wherein the housing is a portable electronic device housing of a portable electronic device.

14. The method of claim 13 wherein the array of microphones comprises at least three microphones.

15. The method of claim 14 wherein the providing of the tracking system further comprises providing a face detection system.

16. The method of claim 14 wherein the providing of the tracking system further comprises attaching the array of microphones around the first video camera.

17. The method of claim 13 wherein the housing forms a portion of an apparatus, and wherein the providing of the tracking system further comprises orienting the first video camera towards a user of the apparatus.

18. The method of claim 13 wherein the providing of the tracking system further comprises providing a second video camera, wherein the first and the second video cameras are configured to estimate a beam orientation for the array of microphones.

19. A method comprising:
capturing a first image with a camera of an apparatus;
determining an orientation of a portion of the first image;
controlling a predetermined characteristic of an array of microphones of the apparatus based at least partially on the orientation of the portion of the first image, wherein the array of microphones is configured to have an adjustable beam, wherein the camera and the array of microphones are proximate an exterior portion of the apparatus, wherein the controlling of the predetermined characteristic of the array of microphones further comprises controlling and directing a sensitivity of the adjustable beam of the array of microphones while a user is speaking in response to a tracked head position of the user relative to the audio-visual source tracking system, wherein the audio-visual source tracking system is further configured to adjust and direct the sensitivity of the adjustable beam of the array of microphones based at least partially upon a detected face of the user at a time after an initial face detection of the user, wherein a direction of the array of microphones is determined based, at least partially, on a ratio of the camera focal length and a reference point of the user, and wherein the apparatus is a portable electronic device; and
updating a location of the user.

20. The method of claim 19 wherein the capturing of the first image further comprises capturing an image of a user of the apparatus, and wherein the determining of the orientation of the portion of the first image, further comprises at least one of: determining an orientation of a head of the user; and detecting a face of a user of the apparatus in the first image.

21. The method of claim 20 wherein the controlling of the predetermined characteristic of the array of microphones further comprises controlling a predetermined characteristic of the array of microphones based at least partially on the determined head orientation.

22. The method of claim 21 wherein the controlling of the predetermined characteristic of the array of microphones further comprises adjusting and directing a sensitivity of the array of microphones based at least partially on the determined head orientation.

23. The method of claim 19 further comprising:
capturing a second image with the camera of the apparatus; and
determining an orientation of a portion of the another image based at least partially on the determined orientation of the portion of the first image.

24. A program storage device readable by a machine, tangibly embodying a program of instructions executable by the machine for performing operations to sense an audio signal, the operations comprising:
analyzing a portion of an image with an audio-visual source tracking system;
calculating a direction corresponding to the portion of the image, wherein the direction is relative to an apparatus, and wherein the image is captured by a first and second cameras of the apparatus; and
directing an array of microphones from the apparatus based at least partially upon the calculated direction, wherein the first and second cameras and the array of microphones are proximate an exterior portion of the apparatus, wherein the array of microphones is configured to have an adjustable beam, wherein the audio-visual source tracking system is configured to adjust and direct a sensitivity of the adjustable beam of the array of microphones while a user is speaking at least partially in response to the calculated direction which tracks a head position of a user relative to the audio-visual source tracking system and is configured to update a location of the user, wherein the audio-visual source tracking system is further configured to adjust and direct the sensitivity of the adjustable beam of the array of microphones based at least partially upon a detected face of the user at a time after an initial face detection of the user, wherein a direction of the array of microphones is determined based, at least partially, on a ratio of the camera focal length and a reference point of the user, and wherein the apparatus is a portable electronic device.

25. The program storage device of claim 24 wherein the calculating of the direction corresponding to the portion of the image further comprises calculating a position of a mouth of a user of the apparatus captured in the image.

* * * * *

UNITED STATES PATENT AND TRADEMARK OFFICE
CERTIFICATE OF CORRECTION

PATENT NO. : 9,445,193 B2  Page 1 of 1
APPLICATION NO. : 12/221395
DATED : September 13, 2016
INVENTOR(S) : Tico et al.

It is certified that error appears in the above-identified patent and that said Letters Patent is hereby corrected as shown below:

In the Claims

Claim 2, col. 9, line 66 --at-- should be inserted in between "comprises" and "least".

Signed and Sealed this
Twentieth Day of December, 2016

Michelle K. Lee
*Director of the United States Patent and Trademark Office*